(12) United States Patent
Kim

(10) Patent No.: US 6,363,806 B1
(45) Date of Patent: Apr. 2, 2002

(54) SHIFT CONTROL METHOD FOR PNEUMATIC SHIFT SYSTEM

(75) Inventor: Young-Rock Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/567,872

(22) Filed: May 8, 2000

(30) Foreign Application Priority Data

Jun. 30, 1999 (KR) .............................................. 99-26056

(51) Int. Cl.$^7$ .............................................. F16H 59/02
(52) U.S. Cl. ...................... 74/335; 74/473.11; 74/473.3
(58) Field of Search .............................. 74/335, 473.11, 74/473.3

(56) References Cited

U.S. PATENT DOCUMENTS

| | | | | |
|---|---|---|---|---|
| 3,939,722 A | * | 2/1976 | Stromberg ................. | 74/336 R |
| 4,269,079 A | * | 5/1981 | Fredell et al. .............. | 477/311 |
| 5,433,125 A | * | 7/1995 | Muller ...................... | 74/335 X |
| 5,797,294 A | * | 8/1998 | Bohner et al. ................ | 74/335 |
| 6,170,347 B1 | * | 1/2001 | Kim ........................... | 74/335 |
| 6,196,077 B1 | * | 3/2001 | Lee ............................ | 74/335 |

FOREIGN PATENT DOCUMENTS

| | | | |
|---|---|---|---|
| JP | 11326105 | * | 11/2000 |
| JP | 11343855 | * | 2/2001 |

* cited by examiner

*Primary Examiner*—Charles A Marmor
*Assistant Examiner*—Ha Ho
(74) *Attorney, Agent, or Firm*—Christie, Parker & Hale, LLP

(57) ABSTRACT

A shift control method for a pneumatic shift system including the steps of determining if a gearshift lever is positioned in a neutral range after receiving gearshift lever position signals, controlling a first magnetic chamber of a magnetic valve assembly from ON to OFF for a predetermined time interval if the gearshift lever is in the neutral range, and controlling both the first magnetic chamber and a second magnetic chamber of the magnetic valve assembly to ON if the predetermined time interval has elapsed.

2 Claims, 4 Drawing Sheets

SHIFT CONTROL METHOD FOR PNEUMATIC SHIFT SYSTEM

BACKGROUND OF THE INVENTION (a) Field of the Invention

The present invention relates to a shift control method for a pneumatic shift system, and more particularly, to a shift control method for a pneumatic shift system in which a piston of a shift control device of the shift system is rapidly returned to a position effecting neutral shifting following driver manipulation of a gearshift lever to a neutral range from a drive range.

(b) Description of the Related Art

In trucks, buses and other such vehicles in which the engine is provided at the rear of the vehicle, because of the substantial distance between the transmission and the driver, a shift device is typically provided to convey clutch and gearshift lever operations to the transmission. A pneumatic shift system, rather than the conventional hydraulic or mechanical shift system, is being increasingly used to perform such a function. In the pneumatic shift system, air pressure is electronically controlled to change shift speeds and modes of the transmission.

FIG. 1 shows a schematic view of a typical pneumatic shift system to which the present invention is applied. FIG. 2 shows a schematic view of a shift control device and related elements shown in FIG. 1.

In the pneumatic shift system, a lever position sensor 6 detects driver manipulation of a gearshift lever 4L. The lever position sensor 6 outputs electrical signals corresponding to the change in position of the gearshift lever 4L to an electronic control unit (ECU 8), after which the ECU 8 outputs signals to control a magnetic valve assembly 10 to open and closed states according to the signals received from the lever position sensor 6. Accordingly, air is supplied to or exhausted from a shift control device 12 to control a transmission 14 into various forward and reverse shift speeds and modes.

The magnetic valve assembly 10 is connected to an air tank 15 and receives the supply of air from the air tank 15. Also, by the supply and exhaust of air from and to the air tank 15 via a reaction valve 18, which is a 3-way magnetic valve connected to a reaction cylinder (not shown), shift feeling is provided to the driver when the gearshift lever 4L is manipulated to different shift modes.

The ECU 8 is connected to a shift mode display 20, and the ECU 8 performs control such that the shift mode display 20 displays the present shift mode after receiving signals from the lever position sensor 6. The ECU 8 is also connected to a warning lamp 24 which alerts the driver of either shift failure caused by the incorrect supply of air to the magnetic valve assembly 10, or of the mis-operation of the gearshift lever 4L by the driver. The ECU 8 detects such problems through its connection with a shift mode sensor 22.

The shift control device 12 includes a first cylinder 26 and a second cylinder 28. Air is supplied to and exhausted from the first cylinder 26 and the second cylinder 28 by the operation of the magnetic valve assembly 10 which operates according to signals output from the ECU 8. The magnetic valve assembly 10 and the shift control device 12 are connected via air pipes 9 to enable such operation. A piston 30 is slidably disposed within the shift control device 12. The piston 30 is displaced in a rightward or leftward direction (in the drawing) according to the supply of air to the first cylinder 26 and the second cylinder 28.

A striker 32 is fixedly disposed on the piston 30. Accordingly, when the piston 30 is displaced in the leftward direction, the striker 32 is also moved such that it operates the transmission 14 to either a first, third or fifth speed of a drive range; and when the piston 30 is displaced in the rightward direction, the striker is moved such that it operates the transmission 14 to either a second or fourth speed of the drive range, or into reverse. That is, when the driver operates the gearshift lever 4L to different shift modes, the ECU 8 controls the magnetic valve assembly 10 so that air is supplied to or exhausted from the first cylinder 26 and the second cylinder 28 of the shift control device 12, thereby controlling the displacement of the piston 30 and the striker 32.

Accordingly, when the gearshift lever 4L is shifted into one of the drive ranges from the neutral range, starting from a state of equilibrium, compressed air is exhausted from either the first or second cylinder 26 and 28 such that smooth shifting is realized. However, when the gearshift lever 4L is shifted into the neutral range from one of the drive ranges, shifting is delayed by the operation of again obtaining a state of equilibrium by overcoming the force of compressed air acting in one direction.

SUMMARY OF THE INVENTION

The present invention has been made in an effort to solve the above problems.

It is an object of the present invention to provide a shift control method for a pneumatic shift system in which to effect shifting into neutral, compressed air is supplied to both cylinders of the pneumatic shift system following the rapid exhaust of compressed air from one of the two cylinders, thereby realizing rapid shifting into the neutral range.

To achieve the above object, the present invention provides a shift control method for a pneumatic shift system including the steps of determining if a gearshift lever is positioned in a neutral range after receiving gearshift lever position signals; controlling a first magnetic chamber of a magnetic valve assembly from ON to OFF for a predetermined time interval if the gearshift lever is in the neutral range; and controlling both the first magnetic chamber and a second magnetic chamber of the magnetic valve assembly to ON if the predetermined time interval has elapsed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
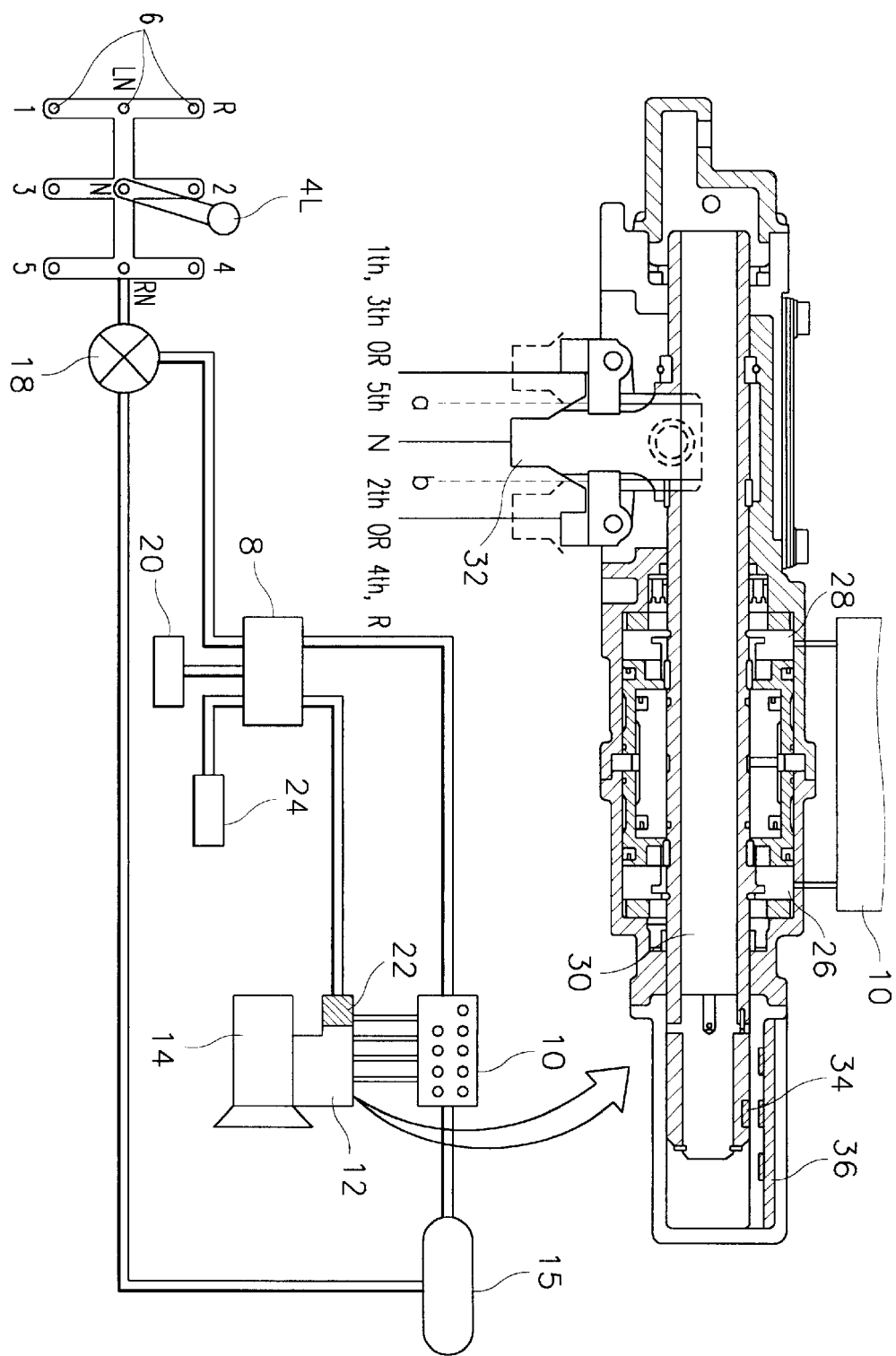
FIG. 1 is a schematic view of a typical pneumatic shift system to which the present invention is applied.
Figure 2:
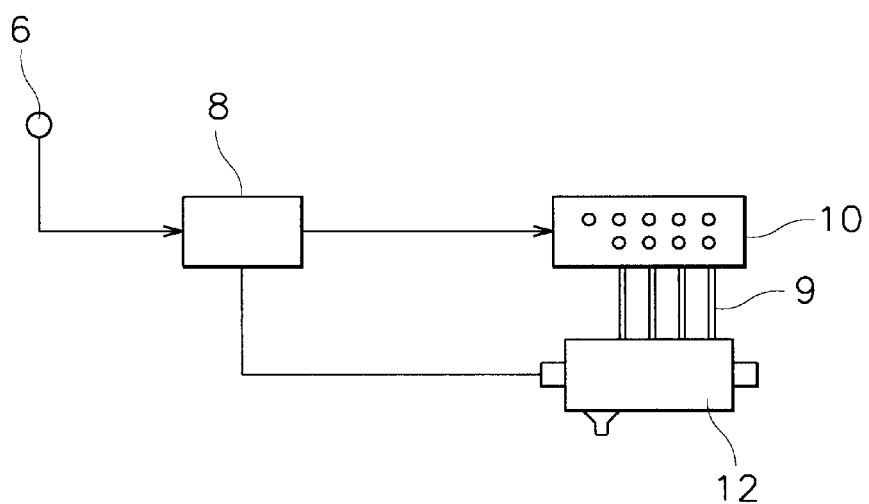
FIG. 2 is a schematic view of a shift control device and related elements shown in FIG. 1.

A pneumatic shift system to which the present invention is applied is structured as shown in FIGS. 1 and 2 and as described in the Background of the Invention. Accordingly, a detailed description of the structure will not be given.

Figure 4:
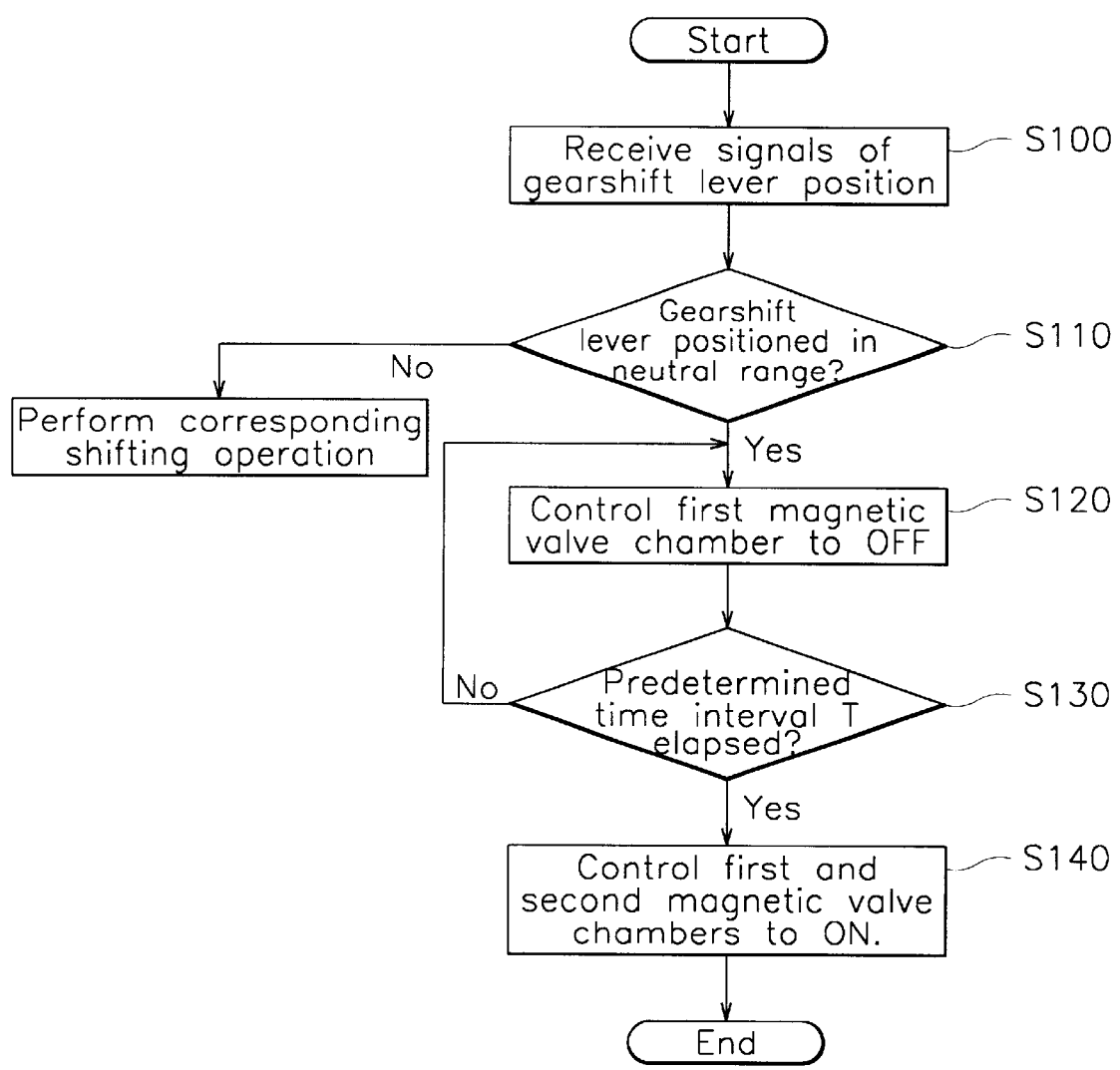
FIG. 4 is a flow chart of a shift control method for a pneumatic shift system according to a preferred embodiment of the present invention.

FIG. 4 shows a flow chart of a shift control method for a pneumatic shift system according to a preferred embodiment of the present invention.

If the driver positions a gearshift lever 4L in a neutral range from a drive range, an electronic control unit (ECU) 8 receives signals corresponding to the change in position of the gearshift lever 4L from a lever position sensor 6 in step S100. The ECU 8 then determines if the gearshift lever 4L is positioned in the neutral range in step S110.

Figure 3A:
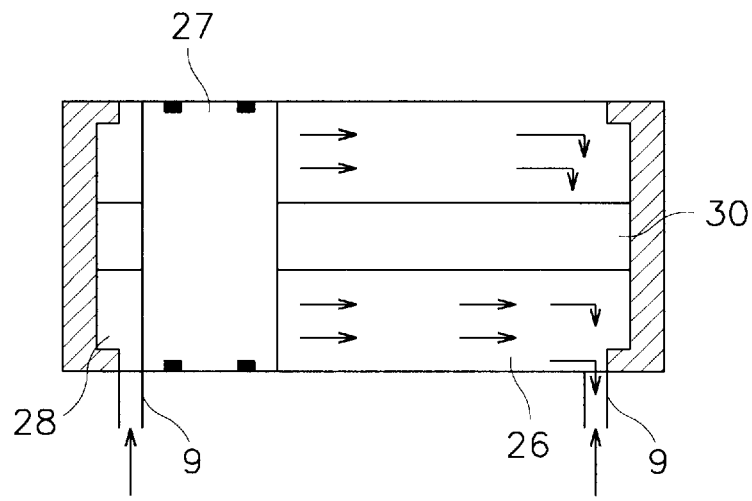
FIGS. 3a and 3b are enlarged views of section A of FIG. 1.

If it is determined in step S110 that the gearshift lever 4L is in the neutral range, the ECU 8 controls a first magnetic valve chamber (MVA V/V) of the magnetic valve assembly 10 from ON to OFF for a predetermined time interval T such that compressed air supplied to a first cylinder 26 of a shift control device 12 is exhausted in step S120 as shown in FIG. 3a. At this time, a second magnetic valve chamber (MVB V/V) of the magnetic valve assembly 10 remains in an OFF state.

Figure 3B:
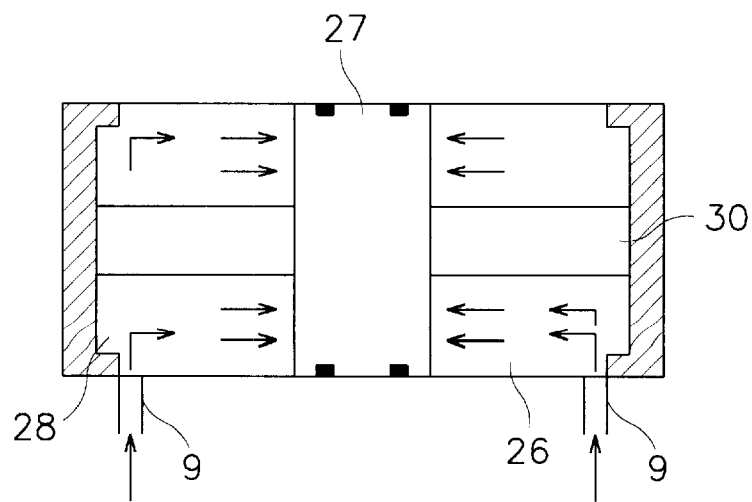

Subsequently, it is determined if the predetermined time interval T has elapsed in step S130. If the predetermined time interval T has elapsed, the ECU 8 controls both the first and second magnetic valve chambers (MVA V/V) and (MVB V/V) to ON such that compressed air is supplied simultaneously to the first cylinder 26 and a second cylinder 28 of the shift control device 12 in step S140. In more detail, the ECU 8 controls the first and second magnetic valve chambers (MVA V/V) and (MVB V/V) to ON such that compressed air from an air tank 15 is supplied at an identical level of pressure to the first and second cylinders 26 and 28 of the shift control device 12, thereby resulting in a piston 30 of the shift control device 12 being positioned centrally as shown in FIG. 3b. As a result, a striker 32 integrally mounted to the piston 30 undergoes a change in position such that shifting is realized.

In the method of the present invention as described above, through the supply of compressed air simultaneously to both the cylinders of the shift control device after compressed air has been exhausted from one of the two cylinders to thereby release the biasing force on the piston of the shift control device, shifting into the neutral range is performed rapidly.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for a pneumatic shift system comprising the steps of:
   determining if a gearshift lever is positioned in a neutral range after receiving gearshift lever position signals;
   controlling a first magnetic chamber of a magnetic valve assembly from ON to OFF for a predetermined time interval if the gearshift lever is in the neutral range; and
   controlling both the first magnetic chamber and a second magnetic chamber of the magnetic valve assembly to ON if the predetermined time interval has elapsed.

2. A shift control device for a pneumatic shift system comprising:
   an outer casing;
   a piston and rod assembly slidably provided in the outer casing, the piston air-tightly contracting an inside surface of the outer casing;
   first and second cylinders provided on opposite sides of the piston, and being defined by the outer casing and the piston, the first cylinder communicating with a first magnetic valve chamber of a magnetic valve assembly to receive the supply of air therefrom and the second cylinder communicating with a second magnetic valve chamber of the magnetic valve assembly to receive the supply of air therefrom; and
   a striker integrally mounted and indexed to the rod assembly, thereby controlling a transmission to different shift ranges; and
   an ECU configured to control the first and second magnetic valve chambers in response to a signal from a gearshift lever, wherein if the gearshift lever is moved to a neutral range, the ECU switches one of the first and second magnetic chambers from an ON position to an OFF position for a predetermined time interval and then switches both the first and the second magnetic valve chambers to an ON position.

* * * * *